United States Patent [19]
Duff

[11] 3,858,454
[45] Jan. 7, 1975

[54] CONVEYOR DRIVE MECHANISM
[75] Inventor: John R. Duff, Cincinnati, Ohio
[73] Assignee: T.K.F., Inc., Cincinnati, Ohio
[22] Filed: Oct. 12, 1973
[21] Appl. No.: 405,912

[52] U.S. Cl.................... 74/229, 74/245 C, 74/246
[51] Int. Cl...... F16h 7/02, F16h 55/30, F16g 13/02
[58] Field of Search................... 74/229, 243 C, 246

[56] References Cited
UNITED STATES PATENTS
2,934,199   4/1960   Winkler........................... 74/229 X
3,016,757   1/1962   Kornylak.......................... 74/229 X
3,394,608   7/1968   Johnson............................... 74/246

Primary Examiner—Leonard H. Gerin
Attorney, Agent, or Firm—Wood, Herron & Evans

[57] ABSTRACT

A conveyor drive mechanism for an overhead enclosed track type conveyor that is adapted to be positioned in a corner turn of the conveyor's track. The drive mechanism includes a plurality of paddles interconnected to one another and positioned relative one to the other on a circular locus of points, the paddles extending radially outward from the center of that circular locus of points. The center of that circular locus of points is in the same plane as, and is also the center point of, the track's corner turn. A power unit is connected to the interconnected paddles, the power unit causing the paddles to rotate in a positive manner about the center of the circular locus of points. Each of the paddles is also independently mounted for pivotal motion about a pivot axis in the plane of the circular locus of points, the paddles being pivotable relative to one another into and out of driving engagement with the conveyor's chain as the chain traverses the conveyor's track in the track's corner turn, thereby driving the conveyor's chain through the conveyor's track. Each of the paddles includes at least one drive dog adapted to engage the conveyor's chain through an elongated slot in the conveyor's track in the corner turn of that track. Cam tracks are provided to positively cam each of the paddle's drive dogs into and out of driving engagement with the conveyor's chain, thereby insuring driving engagement as the chain passes those paddles in proximity to the track.

6 Claims, 4 Drawing Figures

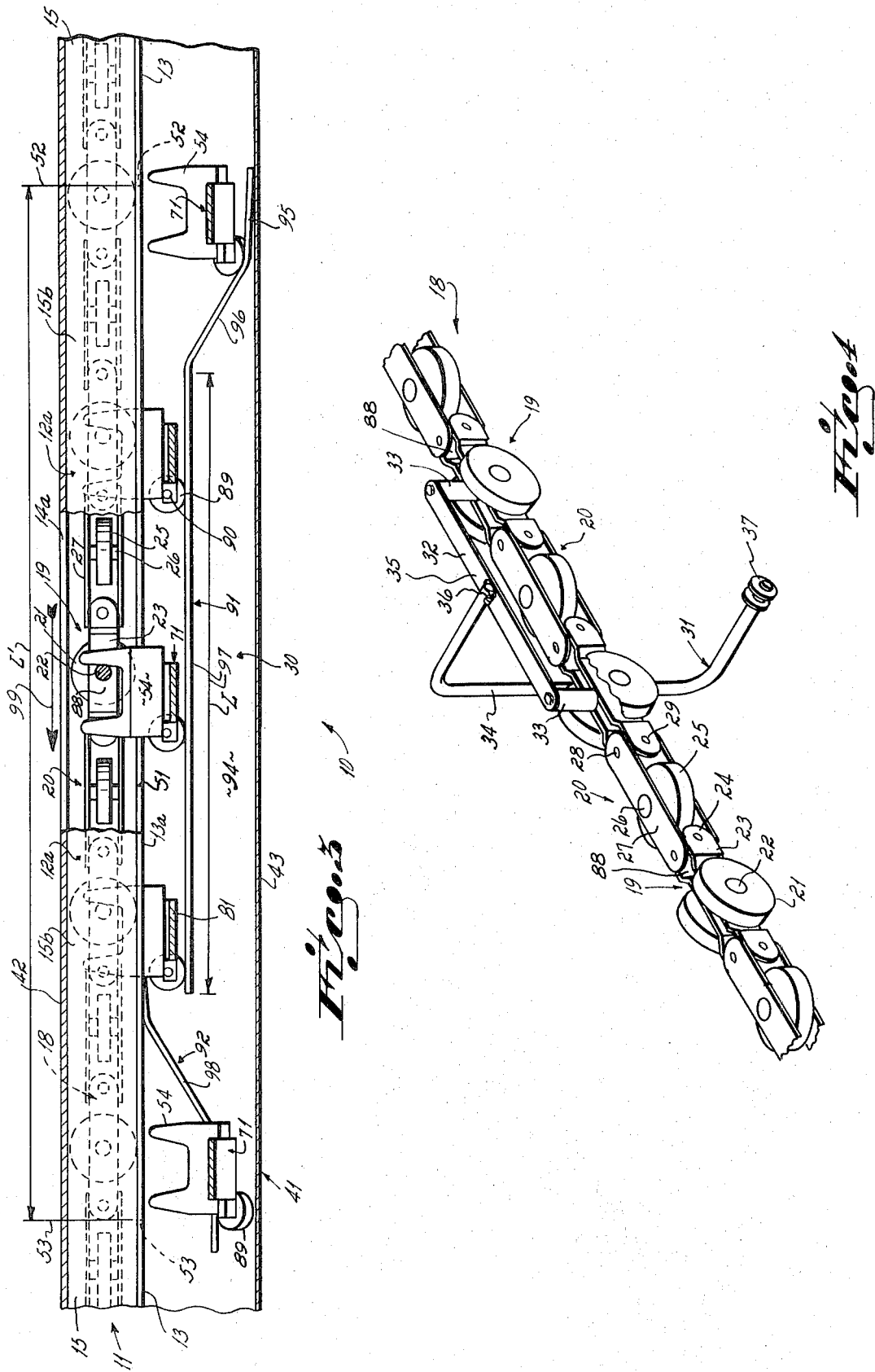

3,858,454

CONVEYOR DRIVE MECHANISM

This invention relates to drive mechanisms. More particularly, this invention relates to a novel drive mechanism for a conveyor.

One basic type of conveyor mechanism well known to industry, and quite widely used throughout industry (particularly in production line situations), is the overhead type conveyor. The overhead conveyor is fixed to a ceiling of a production or other type work area, and carries a series of spaced apart workpiece holders by which workpieces, e.g., the product being manufactured, are retained in operative engagement with the conveyor. The overhead conveyor, of course, functions to move the workpiece from one work station to another, or from one storage area to another, or otherwise as desired.

This basic type of conveyor generally includes a track, and a series of workpiece holders spaced along that track in rolling engagement therewith. A chain or cable interconnects the workpiece holders, and maintains them in the desired spaced relation one to the other. The workpiece holders are either directly connected to wheels which roll on the track (the rolling workpiece holders being connected through the chain), or are indirectly connected by providing wheels on the conveyor's chain which roll on the track (the workpiece holders being fixed to the chain). When the conveyor's chain is moved along the track by means of a conveyor drive mechanism, the workpiece holders are thereby carried from one work station to the other.

There have been two track configurations developed which are particularly useful in connection with overhead conveyors. The first track configuration is known as the I-beam type, and is installed with the I-shaped cross section upright. In this I-beam track structure the workpiece holder is provided with a yoke having wheels on each side thereof, the wheels being supported for rolling motion on the bottom flange of the I-beam track on opposite sides of the track's center flange. The second track configuration is known as the enclosed track type, and is C-shaped in cross-sectional configuration. With the enclosed track, the C-shaped track is normally laid on its side so that the C-configuration opens downward toward the floor of the work area. The enclosed track houses a chain with pairs of wheels spaced therealong, one wheel of each pair being supported for rolling contact on each lip of the conveyor's track, thereby permitting the chain to be easily driven interiorly of the track. In this enclosed track structure, the workpiece holders are fixed directly to the conveyor's chain in spaced relation one to the other. The workpiece holders, of course, extend down through the slotted opening in the base of the track.

However, there is one major drawback with each of the two types of overhead track type conveyors discussed above. This drawback has to do with cleanliness or housekeeping problems created by conveyors which use either of these track structures. Both of these conveyor structures have a tendency to drop dirt from the overhead track into work stations located beneath the conveyor track throughout the length thereof. This for the reason that the conveyors tend to pick up dust and dirt over a prolonged period of use, and flakes or otherwise of such dirt, as well as drops of lubrication on the conveyor, periodically drop off or break loose from the conveyor and fall into the work areas located beneath the conveyor track.

In the instance of the I-beam type conveyor track, there is no ready solution for this problem other than to provide a wide drop pan that extends outwardly 6 or 8 inches or more on either side of the I-beam track beneath the track, this pan extending throughout the entire length of the path. This is undesirable because the workpiece holder must be sized to extend out over and down beneath the drip pan, and this provides a center of gravity problem during operation of the conveyor in that workpieces hung on the workpiece holders tend to swing back and forth transversely relative to the track.

In the instance of the enclosed or C-shaped type track, same may be inverted so that the mouth or slot of the C-shaped track opens upwardly. This is a good solution to the problem where floor-to-ceiling clearance in the work area is great, but is not a good solution where floor-to-ceiling clearance is normal. The drive mechanism primarily used with a so-called overhead enclosed track type conveyor is a caterpillar type conveyor drive mechanism. The caterpillar drive is characterized by an endless drive chain disposed in a vertical plane above or below the enclosed track (depending on whether the C-shaped track is oriented to open upwardly or downwardly), and includes drive dogs thereon in spaced sequence throughout its length. The drive chain is positioned, relative to the conveyor's chain carried within that enclosed track, so that the drive chain's dogs can engage the conveyor's chain through the open slot in the conveyor's track. The endless drive chain is driven through a pair of sprockets by a suitable drive motor. The caterpillar type conveyor drive mechanism takes up a good deal of headroom space when same is located above the enclosed track conveyor; this, of course, requires the conveyor track to be fixed to the ceiling a distance substantially below the ceiling at least throughout that length of track which is adapted to cooperate with the drive mechanism. When the caterpillar type conveyor drive mechanism is disposed beneath the track, it also takes up a good deal of headroom space; this requires workpiece holders of an extended length so that those holders clear the drive mechanism when traversing that length of track which is adapted to cooperate with that drive mechanism. In both instances, headroom problems are created in those work areas having ceilings of a normal, e.g., 8 foot or 10 foot, height. That is, the floor-to-workpiece clearance (as that workpiece is carried on the workpiece holder) is substantially lessened because of the clearance which must be provided to accommodate the caterpillar drive mechanism throughout that length of the conveyor's track which is adapted to cooperate with that drive mechanism.

It has been one objective of this invention to provide a novel drive mechanism for an overhead enclosed track type conveyor that can be located in substantially the same horizontal plane as the track itself.

It has been another objective of this invention to provide a novel drive mechanism for an overhead enclosed track conveyor which is paricularly useful when the conveyor's track is oriented so that it opens toward the ceiling.

In accord with these objectives, the novel conveyor drive mechanism of this invention is especially adapted for use with an overhead enclosed track type conveyor. The conveyor drive mechanism is particularly useful when the enclosed track is oriented so that it opens vertically upward, thereby eliminating the problem of dirt and the like dropping off the conveyor's track and chain into the work area below. When the track is oriented so that it opens vertically upward, the drive mechanism is adapted to alternately engage with and disengage from the chain within the enclosed track from beneath the track through a slot defined in the base of the track, the slot in the base of the track being closed off from the work area by the drive mechanism's housing. This drive mechanism allows the track to be positioned close to the ceiling in the work area throughout the entire length of the track so as to provide optimum floor-to-track clearance within that work area.

More particularly, the novel conveyor drive mechanism of this invention is adapted to be placed at a 90° or 180° corner turn in the track path of the overhead enclosed track conveyor. The drive mechanism's preferred embodiment includes a drive motor that is drivingly connected with a rotatable plate positioned in that corner of the track's path and in the plane of the track in that corner. The plate's rotational axis is the center point of the track's corner turn. The plate carries a series of pivotable paddles that extend beyond its outer periphery in radial fashion relative to the plate's rotational axis. Each paddle is pivotally connected to the plate on an axis transverse to the plate's rotational axis. Each paddle includes at least one drive dog adapted to engage the conveyor chain within the enclosed track through the slot in the base of the track, the drive dogs being located on a circular locus of points having a radius the same as the radius of the track's corner turn. The paddles are positively cammed in sequence both into and out of driving engagement with the conveyor's chain by suitable cam tracks fixed in position relative to the conveyor's track and the slot therein.

Other objectives and advantages of this invention will be more apparent from the following detailed description taken in conjunction with the drawings in which:

FIG. 3 is a cross-sectional view taken along curved line 3—3 of FIG. 1; and

FIG. 4 is a perspective view illustrating the conveyor's chain which is captured within the conveyor's enclosed track, a workpiece holder being shown fixed thereto.

Figure 1:
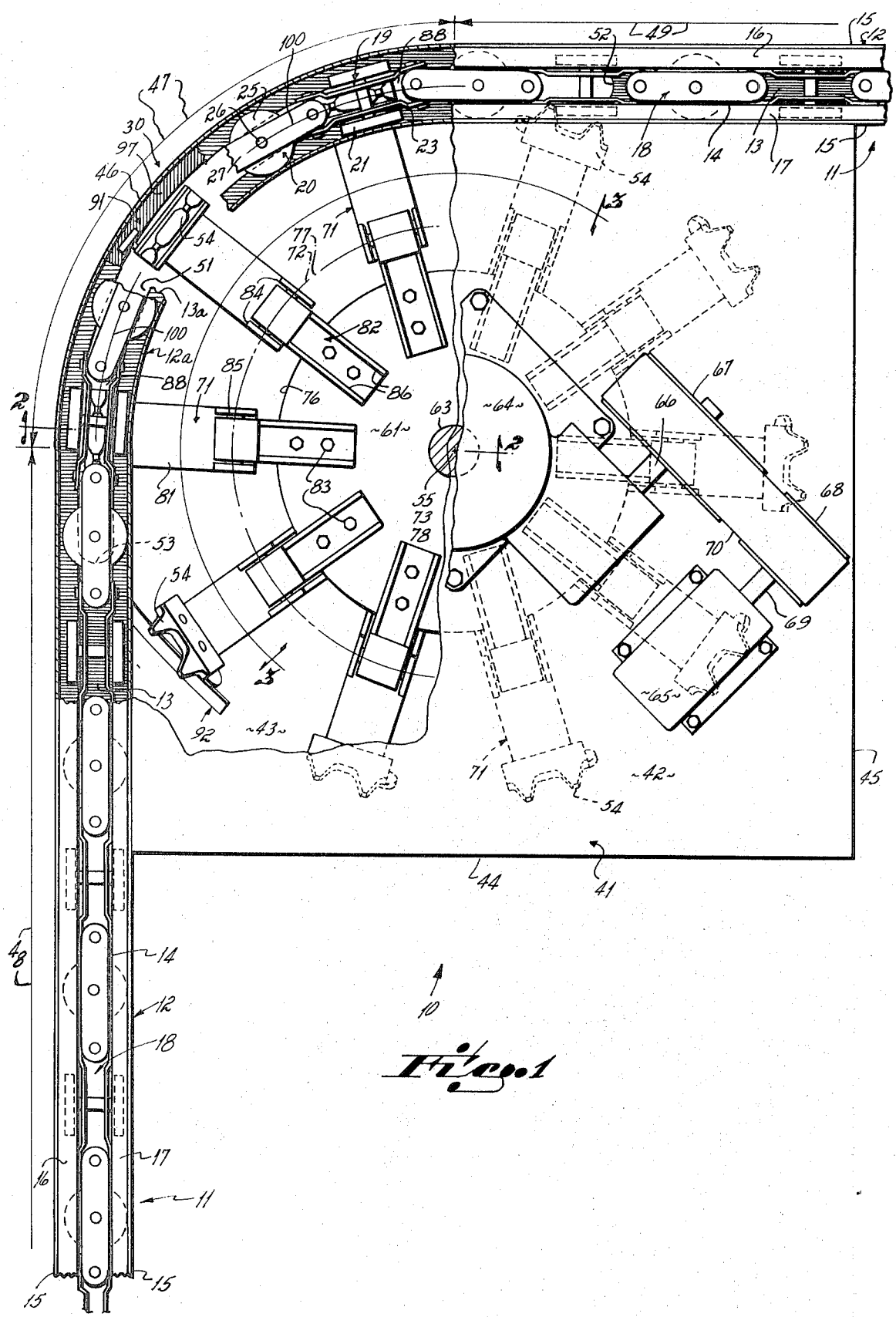
FIG. 1 is a top plan view of the novel conveyor drive mechanism of this invention, the mechanism being illustrated in combination with an overhead enclosed track type conveyor.

As is shown in the Figures, the novel conveyor drive mechanism 10 of this invention is particularly adapted for use with an overhead enclosed track type conveyor 11. The conveyor's enclosed track 12 is of a generally C-shaped configuration, the track being shown in the inverted or upright attitude where same opens vertically upward, see particularly FIGS. 2 and 3. In this attitude of the track 12, floor 13 prevents dirt from dropping through continuous longitudinal slot 14 into the work area disposed beneath the track throughout the length of the track. The track 12 is also provided with enclosed side walls 15 and opposed lips 16, 17 which define the longitudinal slot 14 from one end to the other of the track. The track 12 is suspended from the ceiling (not shown) of a work area by brackets (not shown).

The conveyor's chain 18 is disposed within the enclosed track 12. The chain 18, as illustrated in FIG. 4, is comprised of dual wheel sections 19 and mono wheel sections 20 in alternate sequence. Each dual wheel section 19 is provided with a pair of wheels 21 freely rotatable on axle 22, the axle being carried in arms 23 fixed one to the other. The arms 23, at each end thereof, flare outwardly and cooperate to provide a yoke 24 by which leading and trailing mono wheel sections 20 are attached to each dual wheel section. Each mono wheel section 20 includes a single wheel 25 freely rotatable on axle 26, the axle being trapped between side rails 27. The ends of the side rails 27 are pinned to one another as at 28, each pin 28 being pivotally connected with pin 29 carried by the yoke 24. This provides a universal type joint which allows the mono wheel sections 20 to pivot relative to the dual wheel sections 19 in a plane parallel to the dual wheels, and which allows the dual wheel sections 19 to pivot relative to the mono wheel sections 20 in a plane transverse to the plane of the mono wheel. Thus, the chain 18 is readily adapted to traverse arcuate 90° corner turns (as at 30) in the conveyor track's path, whether those corners be in a plane horizontal to the floor or in a plane vertical to the floor. The mono wheels 25 maintain the conveyor's chain 18 in centered relation relative to the conveyor's track 12 as it cooperates with the side walls 15 of the track. The pairs of wheels 21, in effect, carry the load imparted to the conveyor's chain by workpieces (not shown) hung on workpiece holders 31, and transmit that load to the enclosed track 12.

A number of workpiece holders 31, see FIG. 4, are fixed to the conveyor's chain 18 at spaced intervals therealong. Each workpiece holder 31 includes a head 32 that extends upwardly from and is fixed to the arms 23 of adjacent dual wheel sections 19, posts 33 of that head being located symmetrically relative to the axle 22 of the pair of wheels 21 so as to effectively position the bearing load between two successive dual wheel sections. A C-hook 34 is fixed at the top end 35 to the head 32 as at 36, and is disposed in a plane transverse to the conveyor's chain 18 in known fashion. The free end 37 of the C-hook 34 is disposed in the same vertical panel 38 as the chain 18, that free end being provided with any particular structure for holding workpieces (not shown) thereto. Workpiece holders 31 are not illustrated in combination with the chain 18 shown in FIGS. 1 and 3, but it will be understood to those skilled in the art that the chain is provided with workpiece holders in spaced sequence thereon similar to that shown in FIG. 4.

Figure 2:
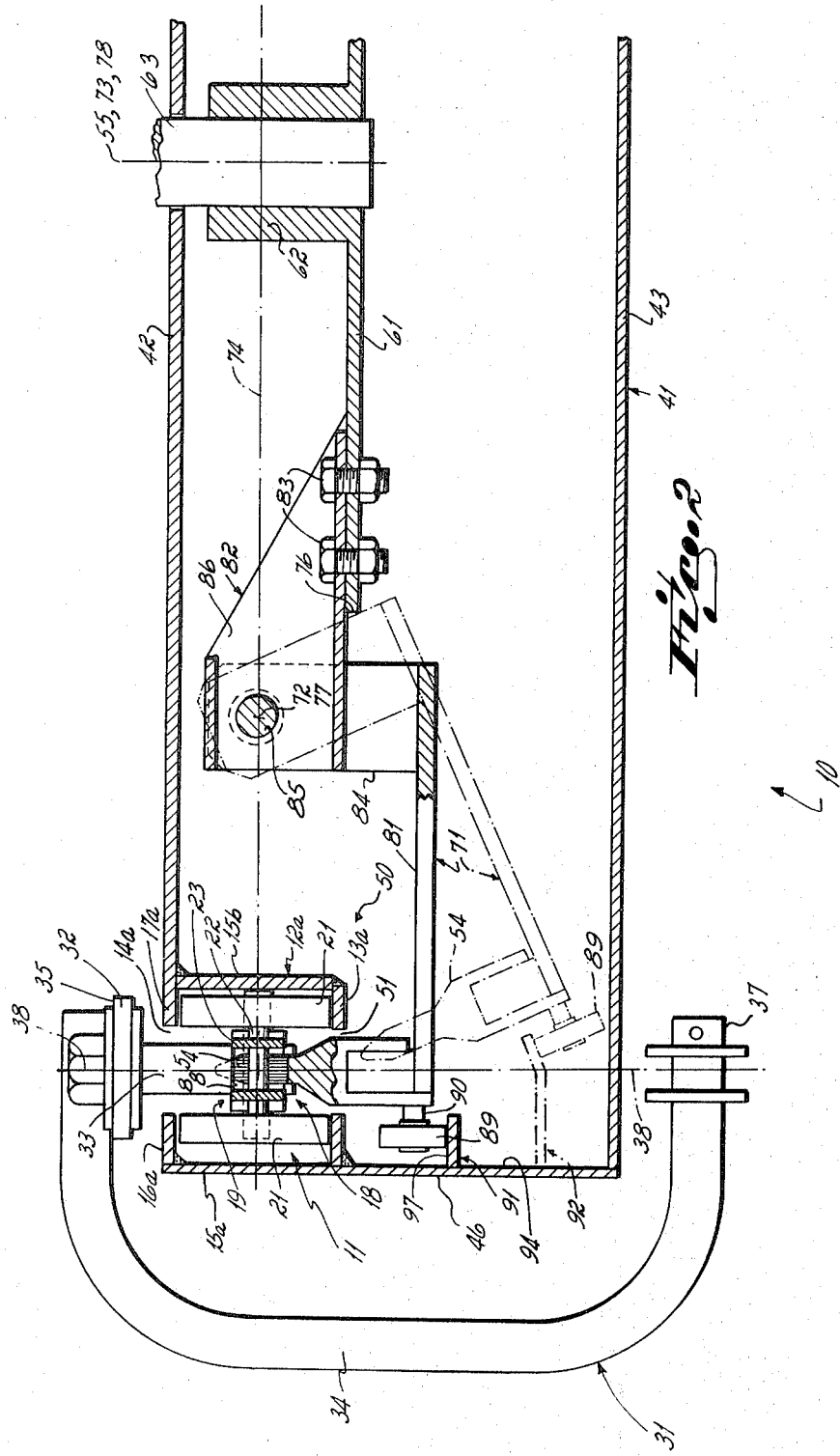
FIG. 2 is a cross-sectional view taken along line 2—2 of FIG. 1.

As shown in FIGS. 1 and 2, the novel conveyor drive mechanism 10 of this invention includes housing 41 having ceiling 42 and floor 43, as well as side walls 44, 45 and curved side wall 46. Curved side wall 46 is contiguous with, and is a continuation of, the outer side wall 15a of the track 12 in the track's 90° corner turn 30. The housing 41 interior is, thus, totally closed off so that the drive mechanism within the housing is totally removed from the work area environment where it is located.

The housing 41 also includes a section 47 of track 12 interiorly of curved side wall 46, this section 47 being aligned and interconnected with straight sections 48, 49 of track 12 at either end thereof, thereby integrating the curved section 47 into the overhead enclosed track conveyor system. The curved track section 47, which is located interiorly of the drive mechanism's housing 41 in a top corner 50 thereof adjacent ceiling 42, is comprised of side walls 15a, 15b and floor 13a, the floor being slotted as at 51 from point 52 to point 53 to accommodate the drive dogs 54 of the drive mechanism 10 as explained in detail below. The lips 16a, 17a of the curved track portion 47 are part of the ceiling 42. The inner side wall 15b of the track is welded to the underside of the housing's ceiling 42, and the track floor 13a is welded to the housing's side wall 46 and to the inner track side wall 15b. The curved track section 47 is, of course, arcuate in configuration with a center point 55.

The drive mechanism 10 also includes a plurality (ten being shown) of paddles 71 interconnected to one another and positioned relative to one another on a circular locus of points 72, the paddles extending radially outward from the center 73 of that circular locus of points, see FIG. 1. Note that the center 73 of that circular locus of points 72 is in the same general plane 74 as, and is also the center point 55 of, the track's corner turn section 47, see FIG. 2. The series of ten paddles 71 is connected to the circular center plate 61 at equal spaced locations about its periphery 76. Each of the paddles 71 is so connected in a pivotal manner on a pivot axis 77, the pivot axis 77 being transverse to the plate's rotational axis 78 as determined by the drive shaft 63, the pivot axis 77 being tangentially disposed relative to the circular locus of points 72, and the pivot axis 77 lying in the plane 74 of the circular locus of points 72. Since the drive shaft 63 is disposed transverse to the plane 74 of the track's corner turn section 47, the motor 65/gear box 64 drive unit thereby causes the paddles to rotate in a positive manner about the center 55, 73 of the circular locus of points 72 on rotational axis 78.

Each of the paddles 71 carries two drive dogs 54 adapted to engage the conveyor chain 18 through the elongated slot 14 in the floor or base 13, 13a of the track 12 as the paddles 71 are rotated by the drive unit 64, 75. The drive dogs 54 function to drivingly interengage the chain 18 by moving upwardly into voids 88 provided in the chain when the paddle 71 is disposed relatively horizontal as illustrated in solid lines in FIG. 2, thereby bearing against the chain and moving it through the track 12 as explained in detail below. Note particularly, drive dogs 54 are mounted on each paddle 71 in a radial location relative to the paddle's rotational axis 78 so that the drive dogs will be in correct spatial relationship relative to, i.e., will drivingly engage, the conveyor's chain 18 when the paddle is in the upraised or driving attitude illustrated in solid lines in FIG. 2. Further, and as is particularly illustrated in FIG. 2, note that the drive mechanism's housing 41 is provided with floor 43 to ceiling 42 clearance sufficient to accommodate corner track section 30, and to allow the paddles 71 to swing between the nondriving attitude illustrated in phantom lines and the driving attitude illustrated in solid lines, all the while enclosing the mechanism 10, 11 from the work environment in which the conveyor 11 is located.

More specifically, the structural elements of the drive mechanism within housing 41 include a circular center plate 61 with a hollow collar 62 at the axial center thereof, see FIGS. 1 and 2. The collar 62, with shear pin (not shown) protection, is fixed to drive shaft 63 extending into the housing 41 through the ceiling 42, the center plate being immobile relative to that drive shaft. The drive shaft 63 is part of a drive unit for rotating the center plate 61 at a controlled rate, that drive unit also including a right angle gear box 64 and drive motor 65 mounted on top the housing's ceiling 42. The right angle gear box 64 includes an input shaft 66 having transfer pulley 67 fixed thereto, and the drive motor 65 includes drive pulley 68 fixed to the drive motor's output shaft 69. The drive pulley 68 and transfer pulley 67 are interconnected by drive belt 70. Thus, rotation of the motor's output shaft 69 is translated into rotation of the drive mechanism's drive shaft 63.

Each of the paddles 71 includes an arm 81 pivotally mounted to the center plate 61 through a bracket 82. The bracket 82 is, basically, of tubular configuration with a square cross section, and is fixed to the circular plate 61 by bolts 83. The arm 81 itself is of a generally L-shaped configuration, spaced feet 84 of the L being pivotally connected to the bracket 82 on shaft 85 carried in opposed side walls 86 of the bracket. The drive dogs 54 are mounted to the free end of the arm, the drive dogs extending upward from the arm 81.

Each paddle 71 also carries a freely rotating guide wheel 89 at the outer end thereof, the wheel being connected to arm 81 through shaft 90 that is radially located relative to the rotational axis 78 of the paddles 71. The guide wheel 89 is adapted to cooperate with cam tracks 91, 92 fixed to the housing's outer peripheral wall 46 on the interior side 94 of that housing 41 wall. The function of the cam tracks 91, 92 is to translate the drive dogs 54 from a retract or storage position (shown in phantom lines in FIG. 2) where same remain when out of contact with chain 18, into an engage or driving position (shown in solid lines in FIG. 2) where same drive the chain 18 through that track 12, and back to the retract or storage position. The cam track 91 includes an inlet track section 95 adapted to engage the guide wheel 89 initially as the paddle 71 approaches the turn section 47 of the track. The up track section 96 of cam track 91 cams each paddle's drive dogs 54 up into driving engagement with chain 18, and the drive track section 97 maintains the paddle in that driving engagement throughout the corner turn 47 of the track 12 since that cam track section 97 is not quite equal in length to the length of slot 41 in the conveyor track's base 13a in the corner turn 47. The cam track 92 includes outlet track section 98 which insures that the paddle 71 is cammed out of driving interengagement with the chain 18 at the end 53 of the track's base slot 51 so that the drive dogs 54 do not jam against the output end 53 of the track's base slot 51. The angulated input leg 96 of cam track 91 is disposed adjacent the input end 52 of the track's base slot 51 and the angulated output leg 97 of the cam track 92 is disposed adjacent the output end 53 of the track's base slot. The center section 97 of cam track 91 is disposed in a horizontal plane relative to the plane 74 of the track 12a in the corner turn 30.

In use, and as is illustrated in FIGS. 1-3, the paddles 71 are rotated by drive shaft 63 on axis 78 because same are fixed to the circular plate 61. As each paddle 71 is rotated about the drive shaft axis 78, the guide wheel 89 on arm 81 is initially caused to ride up on entering cam track segment 95 and onto the section 96, see FIG. 3. As the guide wheel 89 reaches the upper or horizontal portion 97 of the cam track 91, the drive dogs 54 are disposed in driving engagement with a dual wheel section 19 of the chain 18, thereby causing the chain 18 to be driven forward as shown by arrow 99 in FIG. 3 (it will be understood that FIG. 3 depicts the curved section 30 of the track 12 in linear fashon so as to more clearly illustrate the action of the drive mechanism 10). In other words, once a pair of drive dogs 54 has achieved driving interengagement with the conveyor chain 18, that pair, along with two other immediately preceding drive dog pairs (as shown in FIG. 3), provide the driving force to aid in moving the chain 18 (and, hence, the workpiece holders 31 thereon) from a previous location to a subsequent location.

After the paddle's guide wheel 89 has traversed the driving portion 97 of the cam track 91 (which portion is of a length L something less than the length L' of the track's base slot 51), the guide wheel is intercepted by the down section 98 of cam track 92 which forces the drive dogs 54 out of driving engagement with the conveyor's chain 18. This, of course, also forces the paddle back down into the phantom line or storage attitude illustrated in FIG. 2. The paddle 71 and drive dogs 54 remain in the phantom line or storage attitude throughout over three-quarters of their circular travel path as is apparent from FIG. 1. That is, the drive dogs 54 carried by each paddle 71 are only in driving engagement with the chain 18 during that one-quarter or less of their circular travel path in which same corresponds with the arcuate path 100 of the curved turn 30 in the conveyor's track 12. Thus, each pair of drive dogs 54, i.e., each of the paddles 71, is positively cammed into and out of driving engagement with the conveyor's chain 18 in sequence as the chain traverses that section of the drive mechanism's arcuate periphery that is in proximity to the curved section 30 of the track 12. Also, note particularly that the drive mechanism is in substantially the same plane as the plane 74 of the conveyor's track 12 in the corner turn section 30. The drive mechanism's housing 41 extends only slightly below the bottom 13a of the conveyor's track 12, that slight downward extension being only sufficient as is necessary to accommodate the storage or phantom line attitude of the paddles 71 as same are rotated during that period in which they are out of driving engagement with the conveyor's chain.

Having described the preferred embodiment of my invention in detail, what I desire to claim and protect by Letters Patent is:

1. A conveyor drive mechanism for a conveyor's chain, said mechanism including
    a plurality of paddles interconnected to one another and positioned relative one to the other on a circular locus of points, the paddles extending radially outward from the center of that circular locus of points, and the center of that circular locus of points being the center point of, a corner turn of the conveyor chain, said paddles further being independently mounted for pivotal motion about a pivot axis in the plane of the circular locus of points,
    at least one drive dog interconnected with each paddle, each drive dog being adapted to engage the conveyor chain to aid in driving said conveyor chain from one station to another, each drive dog being pivoted into and out of driving engagement with the conveyor's chain on said pivot axis, and
    a power unit connected to the interconnected paddles, said power unit causing said paddles to rotate in a positive manner about the center of the circular locus of points.

2. A conveyor drive mechanism as set forth in claim 1 including
    a cam track provided to positively cam each of said paddle's drive dogs at least into driving engagement with said conveyor's chain, and then hold same in that driving engagement while said chain passes those paddles in proximity to said chain as said chain traverses the corner turn.

3. A conveyor drive mechanism as set forth in claim 2, said cam track further being adapted to cam each of said drive dogs out of driving engagement with said conveyor's chain.

4. A conveyor drive mechanism as set forth in claim 2 including
    a plate mounted in substantially the same plane as said conveyor's chain in the corner turn, said paddles being pivotally connected to said plate, and said power unit being directly connected to said plate.

5. A conveyor drive mechanism as set forth in claim 4 including
    an enclosed track within which said conveyor's chain is positioned, said enclosed track being opened upwardly and defining an elongated slot in the corner turn of said conveyor's chain, said paddles' drive dogs being cammed upwardly on said pivot axis from a storage position beneath said track into driving engagement with said conveyor's chain through said elongated slot.

6. A conveyor drive mechanism as set forth in claim 2 including
    a housing for said drive mechanism, the conveyor track's corner turn being incorporated within said housing, thereby closing said drive mechanism to the operating environment.

* * * * *